(12) United States Patent
Didin

(10) Patent No.: US 7,080,976 B2
(45) Date of Patent: Jul. 25, 2006

(54) VOLUMETRIC ROTARY MACHINE

(75) Inventor: Alexandr Vladimirovich Didin, Korolev (RU)

(73) Assignee: Ilya Yakovlevich Yanovsky, Moscow (RU)

( * ) Notice: Subject to any disclaimer, the term of this patent is extended or adjusted under 35 U.S.C. 154(b) by 0 days.

(21) Appl. No.: 10/399,079

(22) PCT Filed: Oct. 10, 2001

(86) PCT No.: PCT/RU01/00407

§ 371 (c)(1),
(2), (4) Date: Apr. 11, 2003

(87) PCT Pub. No.: WO02/33223

PCT Pub. Date: Apr. 25, 2002

(65) Prior Publication Data
US 2004/0005235 A1    Jan. 8, 2004

(30) Foreign Application Priority Data
Oct. 19, 2000   (RU) ............................... 2000126317

(51) Int. Cl.
*F03C 2/00*   (2006.01)
*F04C 18/00*   (2006.01)
(52) U.S. Cl. ..................................... 418/195; 418/226
(58) Field of Classification Search ............... 418/195, 418/226
See application file for complete search history.

(56) References Cited

U.S. PATENT DOCUMENTS

| | | | | |
|---|---|---|---|---|
| 1,037,655 A | * | 9/1912 | Peigler | 418/226 |
| 1,304,497 A | * | 5/1919 | Maxam | 418/226 |
| 1,367,801 A | * | 2/1921 | Clark | 418/226 |
| 2,090,280 A | * | 8/1937 | Biermann | 418/226 |
| 2,141,982 A | * | 12/1938 | Good | 418/226 |
| 2,411,707 A | | 11/1946 | Biermann | |
| 2,500,143 A | * | 3/1950 | Biermann | 418/195 |
| 3,535,060 A | | 10/1970 | Brown | 418/114 |

(Continued)

FOREIGN PATENT DOCUMENTS

CH    564146    7/1975

(Continued)

OTHER PUBLICATIONS

Plastinin, P.I., et al. "Pump and compressor Building" Refrigerating Machinery Building (1977) vol. 3 No. No. ISSN 0202-7593 pp. 82-85.

(Continued)

*Primary Examiner*—Theresa Trieu
(74) *Attorney, Agent, or Firm*—Frishauf, Holtz, Goodman & Chick, P.C.

(57) ABSTRACT

A fluid flow displacement rotary machine is provided which includes a casing including an inclined rib on an inner surface thereof, and a shaft provided coaxially with the casing such that the shaft and the casing are rotatable with respect to each other. A disk is mounted to the shaft and includes a recess that is engageable with the rib to divide the space and such that the disk rotates about the axis thereof when the shaft moves with respect to the casing. The recess only engages with the rib at first and second rib contacting portions. The first rib contacting portion is provided at an intersection of the first end face of the disk and the first side surface of the recess, and the second rib contacting portion is provided at an intersection of the second end face of the disk and the second side surface of the recess.

8 Claims, 11 Drawing Sheets

U.S. PATENT DOCUMENTS

| | | | | |
|---|---|---|---|---|
| 4,021,165 A | * | 5/1977 | Rylewski | 418/226 |
| 4,224,016 A | | 9/1980 | Brown | 418/191 |
| 4,457,680 A | | 7/1984 | Paget | 418/191 |
| 5,474,043 A | * | 12/1995 | Mallen | 418/226 |

FOREIGN PATENT DOCUMENTS

| | | | | |
|---|---|---|---|---|
| DE | 2 237 297 | | 8/1973 | |
| GB | 509372 | * | 7/1939 | 418/226 |
| JP | 54-132012 | * | 10/1979 | 418/226 |
| RU | 2122129 | | 11/1998 | |
| SU | 757770 | | 8/1980 | |

OTHER PUBLICATIONS

English translation of RU 2122129 C1.

English translation of SU 757770 A.

English translation of Plastnin, P. I., et al. "Pump and Compressor-Building", Refrigerating Machinery Building (1977), vol. 3.

* cited by examiner

VOLUMETRIC ROTARY MACHINE

TECHNICAL FIELD

The present invention relates to mechanical engineering, in particular, to fluid-flow positive displacement rotary machines (hereinafter referred to as DRM (displacement rotary machines) having rotatable working members, and can find application in internal combustion engines (ICE) including diesel engines, in externally powered engines, compressors, pumps, turbines, as well as in measuring equipment, such as flowmeters and dosimeters.

BACKGROUND ART

Known in the art are DRM having translationally rotatable working members, wherein working chambers communicate with the discharge area after precompression occurs, e.g., compressors comprising a casing accommodating spur-gear rotors at least one of which has its teeth provided with grooves, while the teeth of the other rotor have projections mating said grooves (cf., e.g., U.S. Pat. No. 3,535,060, U.S. Pat. No. 4,457,680, U.S. Pat. No. 4,224,016).

Known in the art are also spur rotary compressors available from Ingersoll-Rand Company and having the following construction arrangement: drive is obtained from a master gear to the gears of the two-stage shafts arranged in a V-shaped manner; two compressor rotor spur-gear stages; an intake port disposed in the end covers and partly on a cylindrical boring of the casing; discharge ports are provided in the end covers; the discharge port is closed by the end face of a specially shaped rotor in the course of a compression stroke; the end of an internal (built-in) compression is fixed by opening the discharge port by the end face of one of the rotors (cf., e.g., "Resume of science and technology", series "Pump and Compressor Building. Refrigerating Machinery Building" by P. I. Plastinin and T. M. Kalnin vol. 3, Moscow, VINITI 1986, pp. 83–85).

The above technical solutions suffer from the following disadvantages:
- the DRM under consideration is not a versatile one due to its not being efficient as a compressor because communication between the shut-off space and the discharge area is established without precompression between the rotors. It is not also applicable as an ICE;
- the DRM is not a compact one, since only a part of the sealing disk (i.e., a single tooth) is in action at every instant of time whereas the remainder part of the machine adds to the overall dimensions thereof;
- the peripheral portion of the sealing disk contacts the central screw portion, and vice versa, which deteriorates the contact conditions and adds to friction effective therebetween, thereby affecting the efficiency and service life of the machine.

The most pertinent to the present invention prior art is a DRM comprising a stator having a concentric effective area, and a main (driving) rotor. Said stator and said main rotor define at least one chamber-defining space there between. The DRM further comprises at least one driven rotor rotatable about its own axis which overlaps with the drive rotor axis, said driven rotor being partially deepened in a groove passing through the stator effective area and having at least one recess made across the perimeter thereof, said driven rotor dividing said at least one chamber-defining space into working chambers; inlet and outlet ports for the working fluid to pass, said ports being disposed in fluid communication with the working chambers. The DRM is made as a screw pump comprising a housing, a drive screw, and a toothed rotary sealing disk engaging with the screw. The disk teeth are engaged with the recesses defined between the screw ridges so as to provide a sealed contact therebetween. The teeth of the sealing disk have parallel side surfaces, triangular-shaped clearances being provided between said teeth.

The threaded screw portion is in its part formed as a shoulder or ridge which has a dimension in the direction of the screw rotation such that it corresponds to the screw displacement while moving the sealing disk from a position at which sealing is provided by one of the disk teeth, to a position at which sealing is provided by the next disk tooth (cf. USSR Inventor's Certificate No. 757,770).

SUMMARY OF THE INVENTION

Therefore the object of the present invention is to provide a versatile rotor machine free from a ballast volume (that is, the volume of the structural members of said inventive machine is determined only by strength of materials), less sensitive to abrasive impurities in the working fluid, allowing use of efficient sealing members (of the type of labyrinth ones), and high-efficiency sealing rings. In addition, it is expedient to completely release the driven rotor from the momentum developed by the working fluid on the axis of rotor rotation, which facilitates synchronization of said rotor with the drive rotor and reduces wear on both.

Said object is achieved by a fluid-flow positive displacement rotary machine comprising a stator having a concentric effective area and a drive rotor, said stator and said drive rotor defining at least one chamber-defining space therebetween, at least one driven rotor in the form of a disk serving as a piston, said disk being rotatable about its own axis which is offset from the drive rotor axis, said disk partially extending in a groove provided in the stator and having at least one recess in the periphery thereof, said disk dividing said at least one chamber-defining space into working chambers; inlet and outlet ports for passing a working fluid, said ports being disposed for fluid communication with the working chambers, wherein the chamber-defining space is defined by a surface body of a revolution around the stator of the disk whereby the rotor can rotate around the axis of the stator with simultaneous rotation of the disk around its own axis, and the following relationship is obeyed:

where
p is the number of recesses in the disk,
D is the number of the disk revolutions around its own axis,
R is the number of the revolutions of the rotor around its own axis
N is a positive integer, and the recess arranged in the disk has such a depth at which the bottom of said recess is within the stator in any position assumed by said rotor, and each side face of said recess has at least one drive rotor contacting portion extending along the depth of the Moreover, in order to increase the effective volume of the working chambers and reduce the volume of the machine the stator is provided with a circular ridge wherein the axle of the disk is disposed, thus adding to the specific characteristics of the present DRM.

To use the present DRM as a compressor or an internal combustion engine, the stator is made in the form of a ring having a circular ridge on its inner surface on which the axle of the disk is supported, whereby a process of compression-expansion of the working fluid is carried out by using a torus geometry.

For a better attachment of the disk axle (since heavy-duty bearings may be used) said axle extends beyond the said circular ridge which also provides a possibility of establishing additional (external) synchronization of the drive rotor and the disks.

According to one of the embodiments of the present invention, the rotor is fixed, whereas the stator is rotatable around its own axis. Thereby an "external" fluid tightness is improved, i.e., working fluid leakage into the surrounding environment is reduced. In some instances such an arrangement allows improved internal leak-proofness due to separation of the inlet, outlet, and the working chambers by recessless portions of the disk.

To simplify the shape of the drive rotor and create a constant torque applied to the disk on the part of the working fluid, a drive rotor contacting portion on at least one side face of the recess is made in the form of a rib interconnecting the end face of the disk and the side face of the recess.

To reduce or to eliminate the torque applied to the disk on the part of the working fluid, a second drive rotor contacting portion is made in the form of a second rib disposed on the opposite side face of the recess, the first and the second ribs being situated on one of the disk end faces in order to establish a subtorque applied to the disk on the part of the working fluid, a second drive rotor contacting portion is made in the form of a second rib disposed on the opposite side face of said recess, the first and the second ribs being situated on the opposite end faces of the disk, whereby a compensation for friction in the driven rotor axis is achieved and the shape of the drive rotor and that of the recess in the disk are simplified.

Depending upon the operating conditions of the DRM and preset parameters of the working fluid, the inlet and outlet ports are disposed on the stator and/or the drive rotor, which is caused by a necessity to reduce the intrinsic hydraulic drag of the DRM.

In particular, when taking the working fluid from the surrounding environment the inlet ports are disposed on the stator and drive rotor, and when discharging the working fluid into the surrounding atmosphere the outlet ports are situated on the stator and drive rotor.

BRIEF DESCRIPTION OF THE DRAWINGS

The present invention is further illustrated by the accompanying drawings, wherein.

BEST METHOD OF CARRYING OUT THE INVENTION

Figure 1:
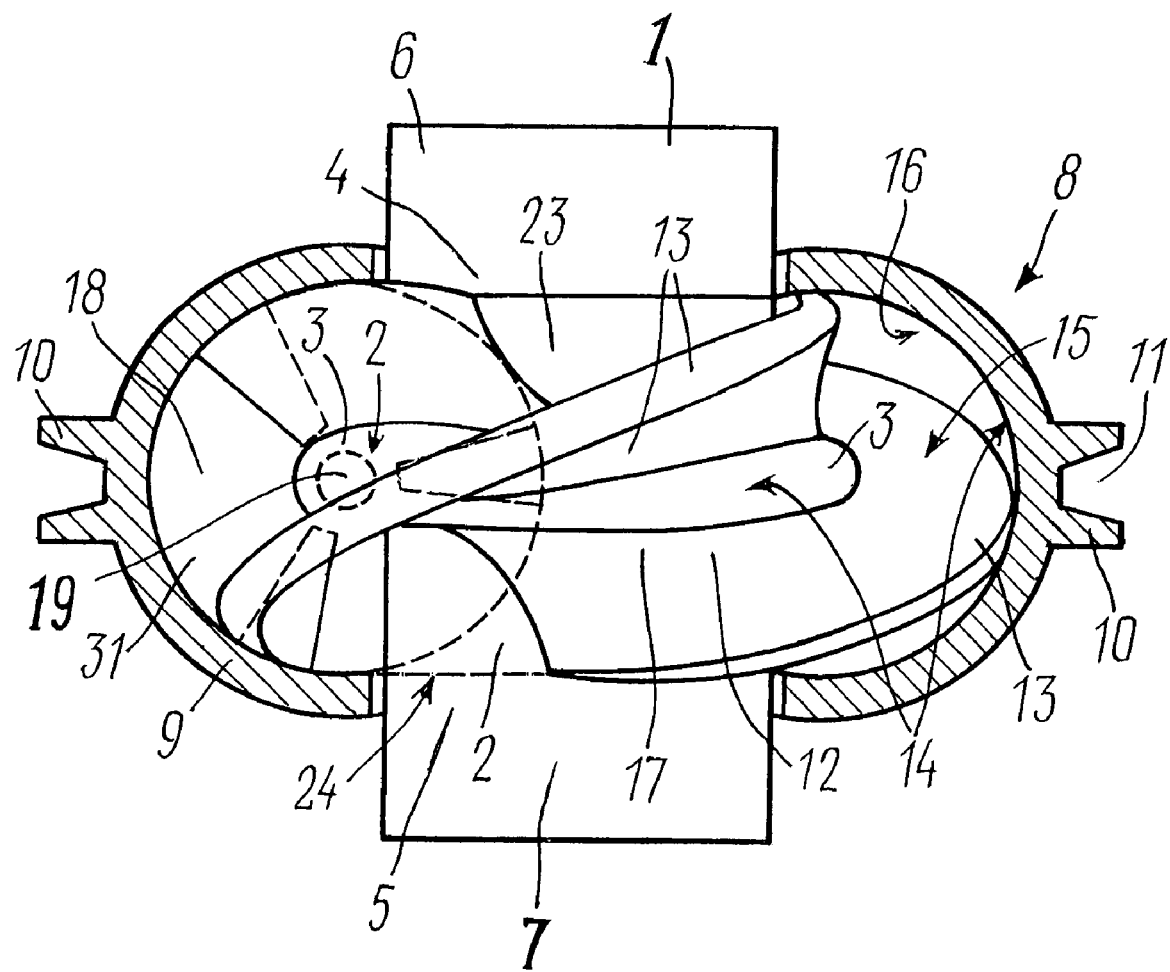
FIG. 1 is a front view of a fluid-flow positive displacement rotary machine (DRM) made in the form of a pump having a single disk.

With reference to FIG. 1 the DRM comprises a shaft 1 serving as a stator having a concentric effective area 2 consisting of a surface 3 of a circular ridge, said surface being connected to surfaces of cylindrical portions 4 and 5 which in turn communicate with a working fluid inlet manifold 6 and a working fluid outlet manifold 7, a casing 8 serving as a drive rotor whose wall 9 has two circular ridges 10 defining a groove 11 for a belt drive (not shown).

Figure 2:
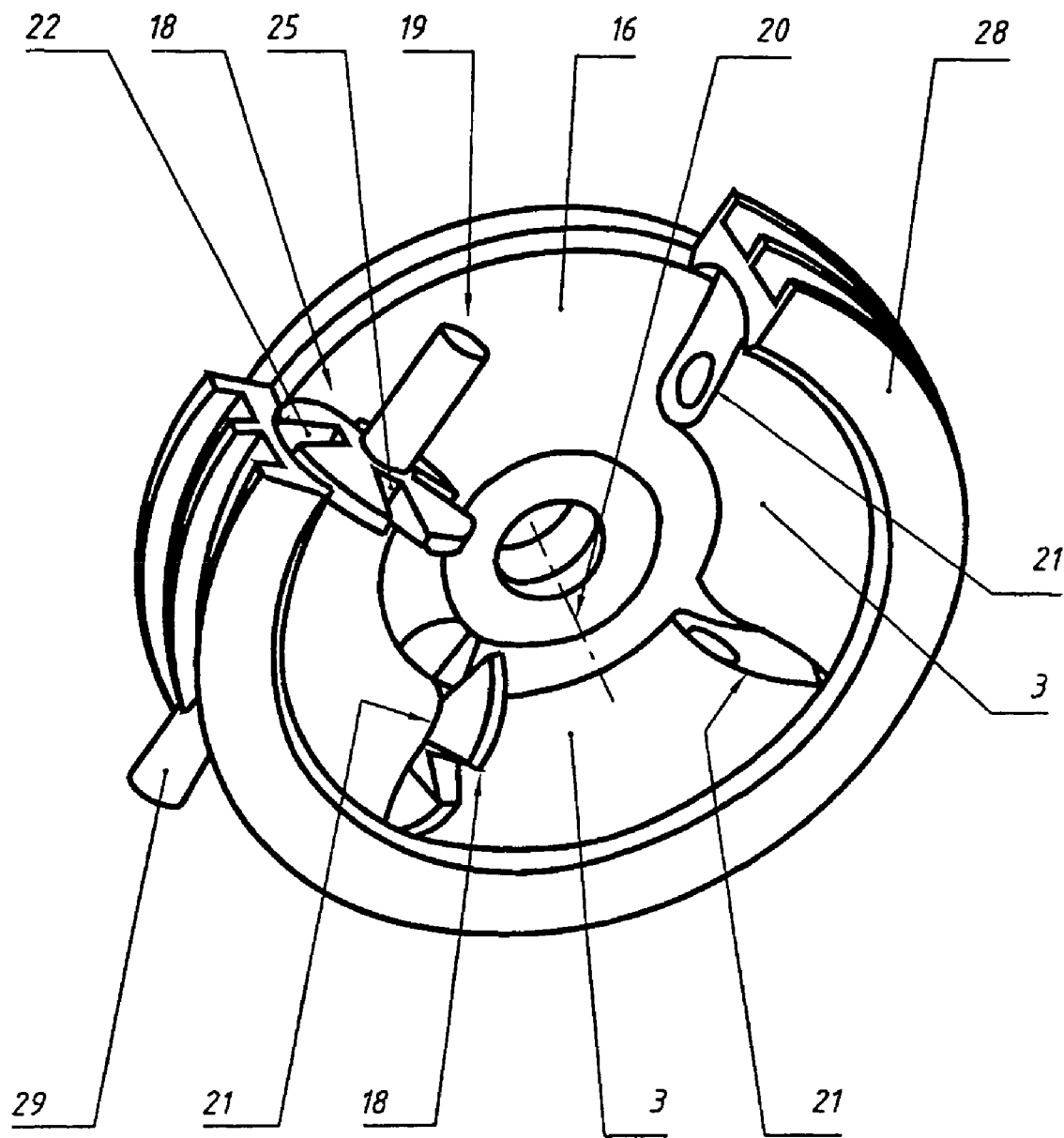
FIG. 2 is a perspective view of a DRM in the form of an internal combustion engine (ICE)

Between the casing 8 (rotor) and the shaft 1 (stator) three chamber-defining spaces 12 are formed separated from one another by ribs 13 of the casing 8. As seen in FIG. 1, the rib 13 is inclined and separates the inlet and outlet in the direction of rotation of the rotor. Surfaces 14 of the chamber-defining spaces 12 are formed by effective areas 15 of the ribs 13, by a concentric inner surface 16 of the wall 9, and by the concentric surface 2 of the shaft 1. The chamber-defining spaces 12 are subdivided into working chambers 17 by a disk 18 serving as a piston, the disk 18 being rotatable around its own axle 19. FIG. 2 depicts four disks 18 serving as pistons. The axle 19 of each of said disks is offset from an axis 20 of the shaft 1. The disk 18 is partially inserted in a groove 21 in shaft 1 and projects into the chamber-defining space. Each of the disks 18 has at least one recess 22 arranged at the periphery of the disk for engaging the rib 13.

Figure 3:
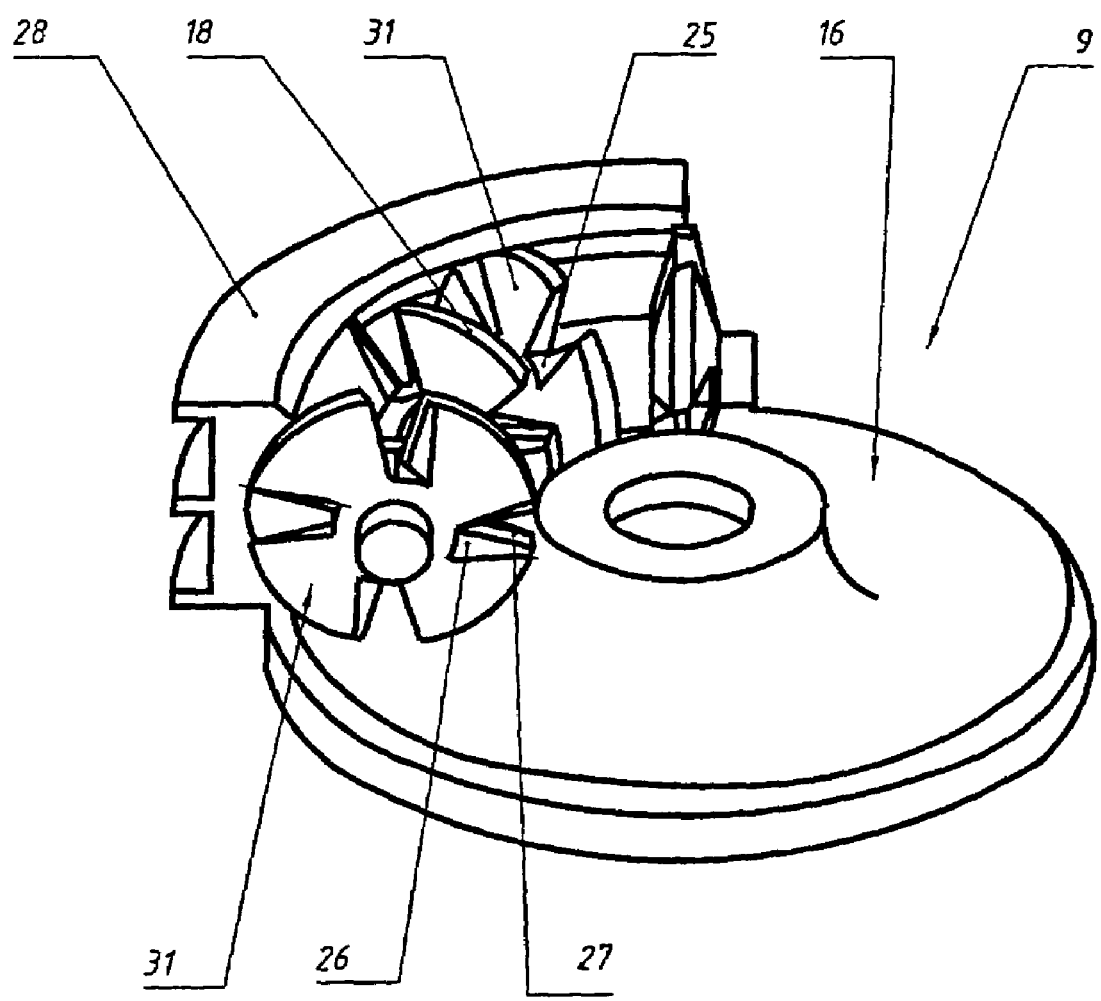
FIG. 3 shows how the surface of the chamber-defining spaces is formed.

FIG. 3 shows the disks each with four such recesses. The shaft 1 (stator) and/or the casing 8 (rotor) is provided with a working fluid inlet port 23 and a working fluid outlet port 24, said ports being adapted to get into fluid communication with the working chambers 17.

FIG. 1 shows the working fluid inlet port 23 disposed in the stator cylindrical portion 4. The chamber-defining space 12 is defined by the surface 14 similar to the surface of a body formed by rotating the shaft 1 together with the disk 18 around the axis 20 of shaft 1 simultaneously with rotation of the disk 18 around its own axle 19. When defining the surface 14 of the chamber-defining space 12 the following relationship is obeyed:

$$\frac{p \cdot D}{R} = N$$

where:
p is the number of recesses 22 in the disk,
D is the number of revolutions of the disk around its own axis,
R is the number of revolutions of the rotor with respect to the stator, and
N is a positive integer.

In addition, the numerical values of the quantities p, D, and R are selected depending on operating conditions of the DRM.

The recess 22 (FIG. 8) arranged at the periphery of the disk 18 has such a depth that a bottom 25 of said recess 22 is situated within the shaft 1 (stator) in any position assumed by said disk 18, and each side face 26 of said recess 22 (FIG. 3) has at least one contacting portion 27 of the side surface 26, said portion 27 extends along a depth of the recess 22.

Figure 6:
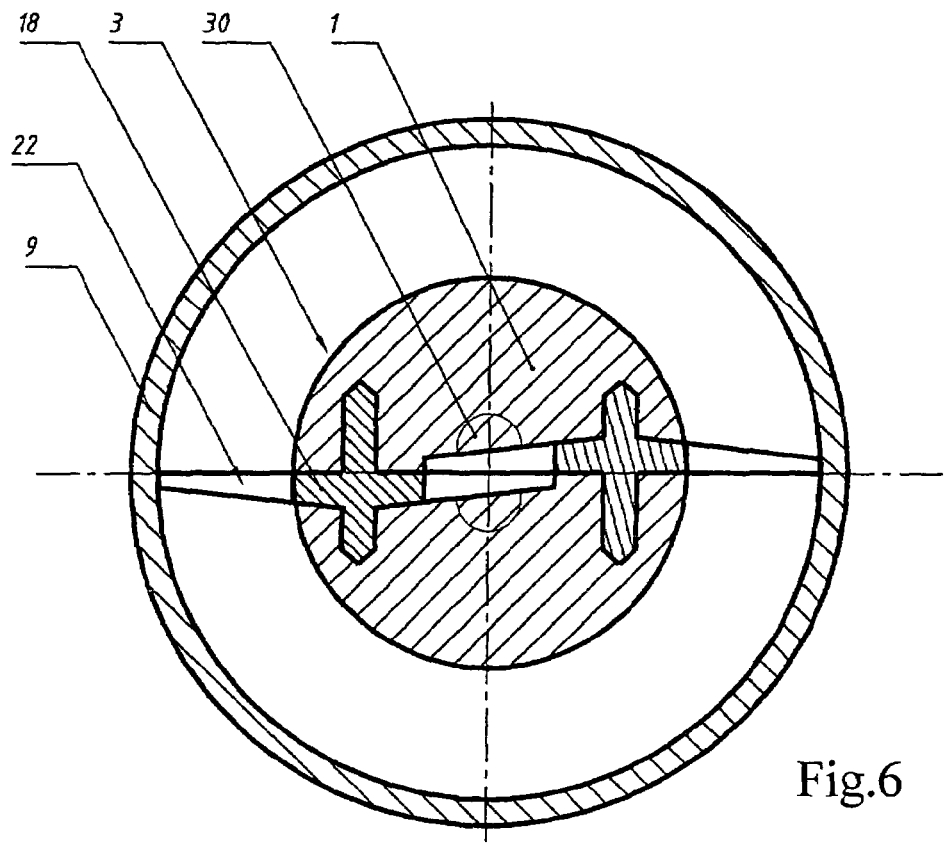
FIG. 6 is a horizontally sectional view taken along a horizontal line of FIG. 5.

FIG. 6 illustrates a fluid-flow positive displacement rotary machine wherein the shaft 1 has a circular outer surface 3 and the axle 19 (axis) of the disk 18 is disposed in the shaft 1.

FIG. 2 illustrates a fluid-flow positive displacement rotary machine wherein the casing is made in the form of a ring 28 having a circular ridge 3 on the internal surface thereof, the axle 19 of the disk being situated inside said circular ridge 3.

FIG. 2 depicts a fluid-flow positive displacement rotary machine, wherein an extension 29 of the axle 19 of the disk 18 protrudes beyond the limits of the circular ridge 3.

Figure 4:
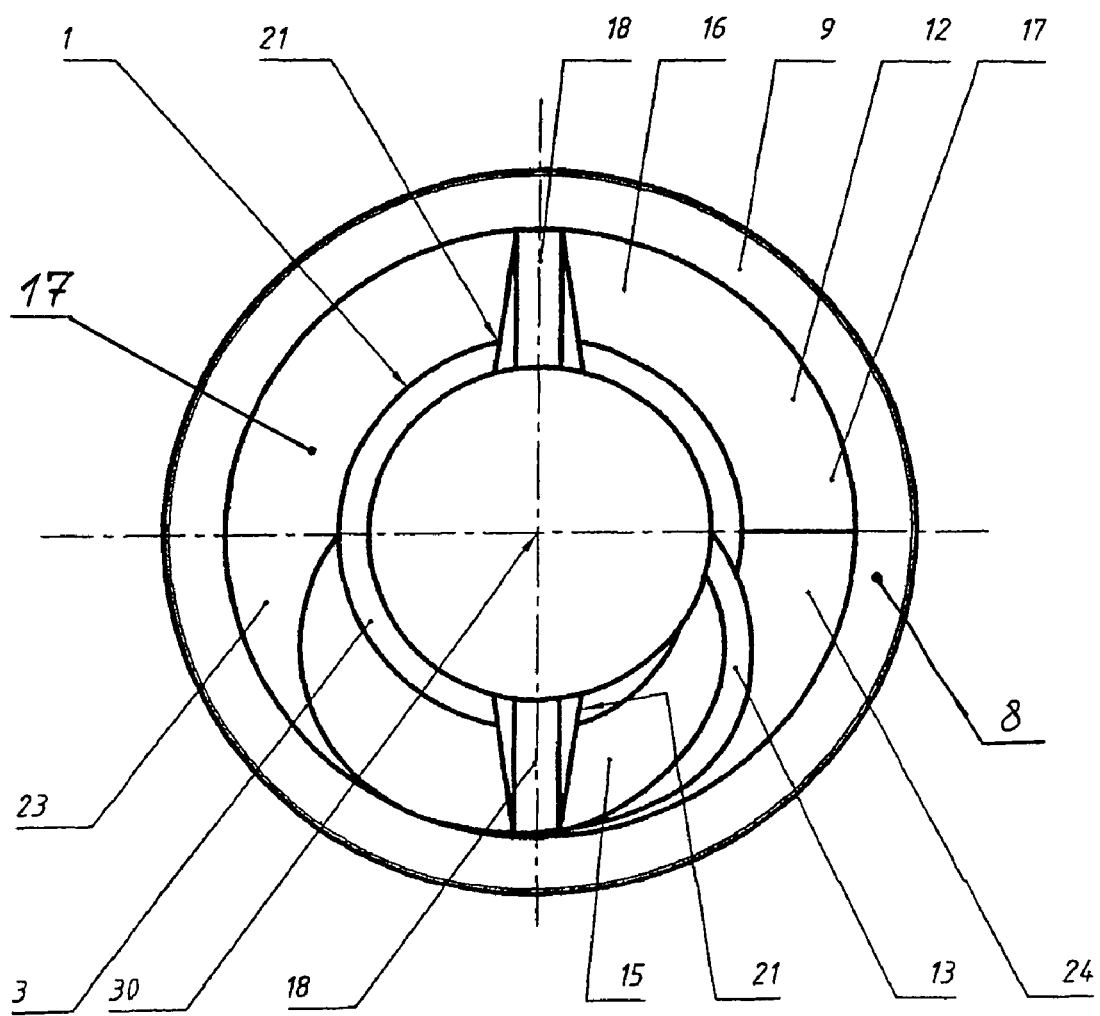
FIG. 4 is a view of a DRM comprising a stationary fixed casing provided with ports, and two alternately operating disks.

FIG. 4 shows a fluid-flow positive displacement rotary machine, wherein the casing 8 is stationary and serves as the stator, while the shaft 1 is rotatable around its own axis 30 and serves as the rotor. There are provided two disks 18 which are additionally synchronized with each other and each has a recess 22.

Figure 5:
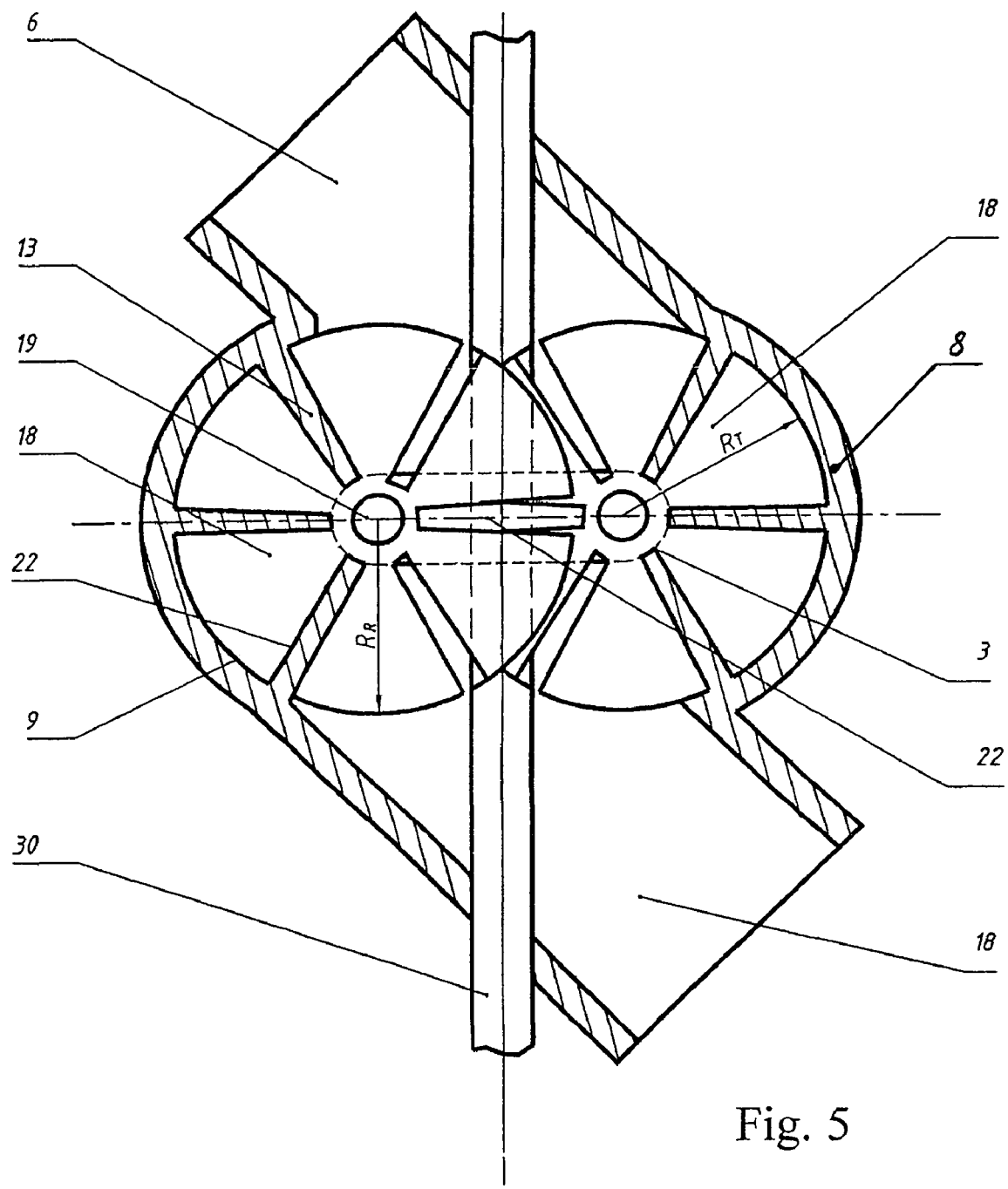
FIG. 5 is a view of a DRM comprising two disks and a stationary shaft provided with ports.

FIGS. 5 and 6 illustrate a fluid-flow positive displacement rotary machine, wherein the drive rotor 8 is fixed stationary, while the stator 1 is rotatable around its own axis 30. There are provided two driven rotors 18 overlapping each other and having six recesses each.

Figure 7:
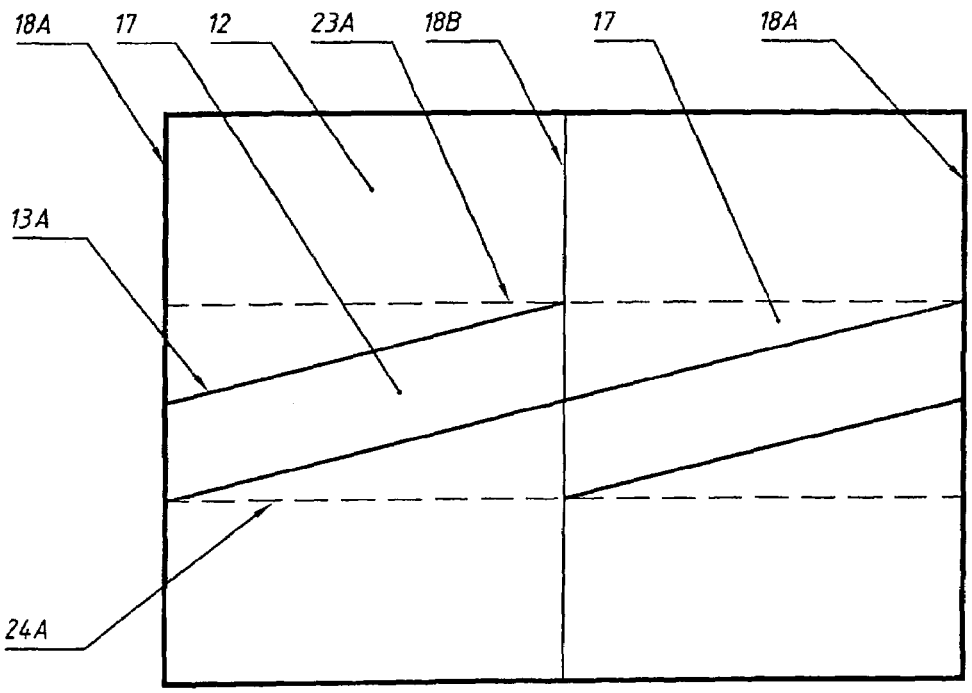
FIG. 7 is a developed view of a toroidal section in the DRM of FIG. 5.

FIG. 7 presents a developed view of a toroidal section illustrating operation of the DEM according to FIGS. 5 and 6. In this particular case the DRM is crossed by the surface of a torus whose axis of symmetry aligns with the axis of the shaft 1 and the axial circumference of which touches the axes of the disks 18. A radius $R_T$ of section of said torus is equal to the section radius $R_R$ of the disk 18. In said developed view two lateral lines 18A represent the same disk 18, and the center line 18B denotes the other disk 18. The slanting lines 13A denote the ribs 13 between which the chamber-defining spaces 12 are formed. The chamber-defining spaces 12 are subdivided into the working chambers 17 by the disks 18. The dotted lines indicate the working fluid inlet and outlet ports 23A and 24A.

FIGS. 5 and 6 illustrate a fluid-flow positive displacement rotary machine, wherein the casing 8 is fixed stationary, while the shaft 1 is rotatable around its own axis 30. There are provided two disks 18 overlapping each other and having six recesses 22 each.

Figure 8:
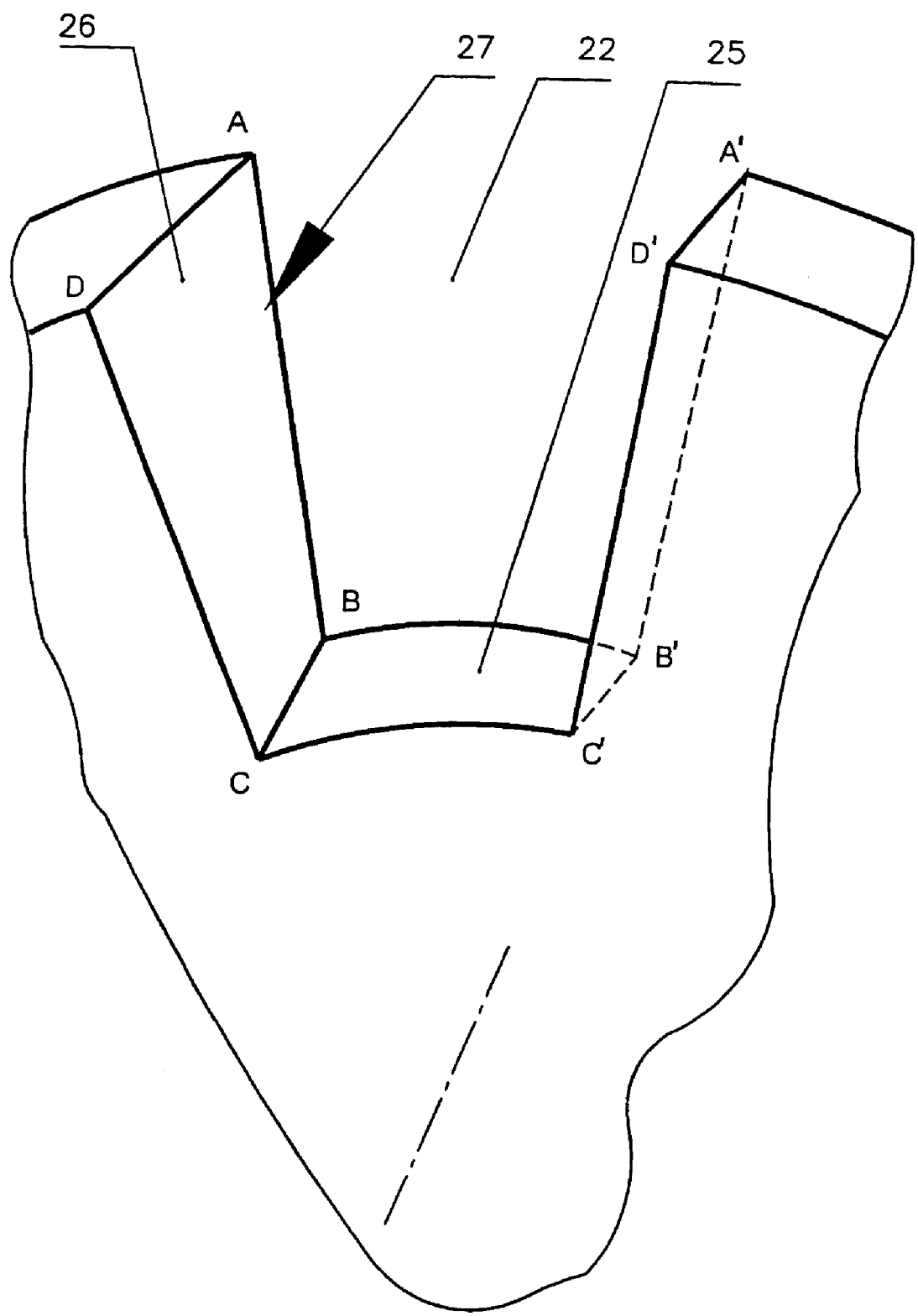
FIGS. 8 and 9 are perspective partial views of the disk showing differently provided recesses across the periphery thereof.

FIG. 8 shows the recess 22 in the disk 18 of the DRM. It is the rib AB of the side face 26 (ABCD) of the recess 22 that is in fact the drive rotor contacting portion 27, said rib interconnecting the disk end face 31 with the side face 26 of the recess 22. In this particular case a second contacting portion on the other side face A'B'C'D' of the recess 22 is in fact the rib A'B' formed at intersection of the side face A'B'C'D' of the recess 22 with the disk end face on which the edge AB is disposed.

Figure 9:
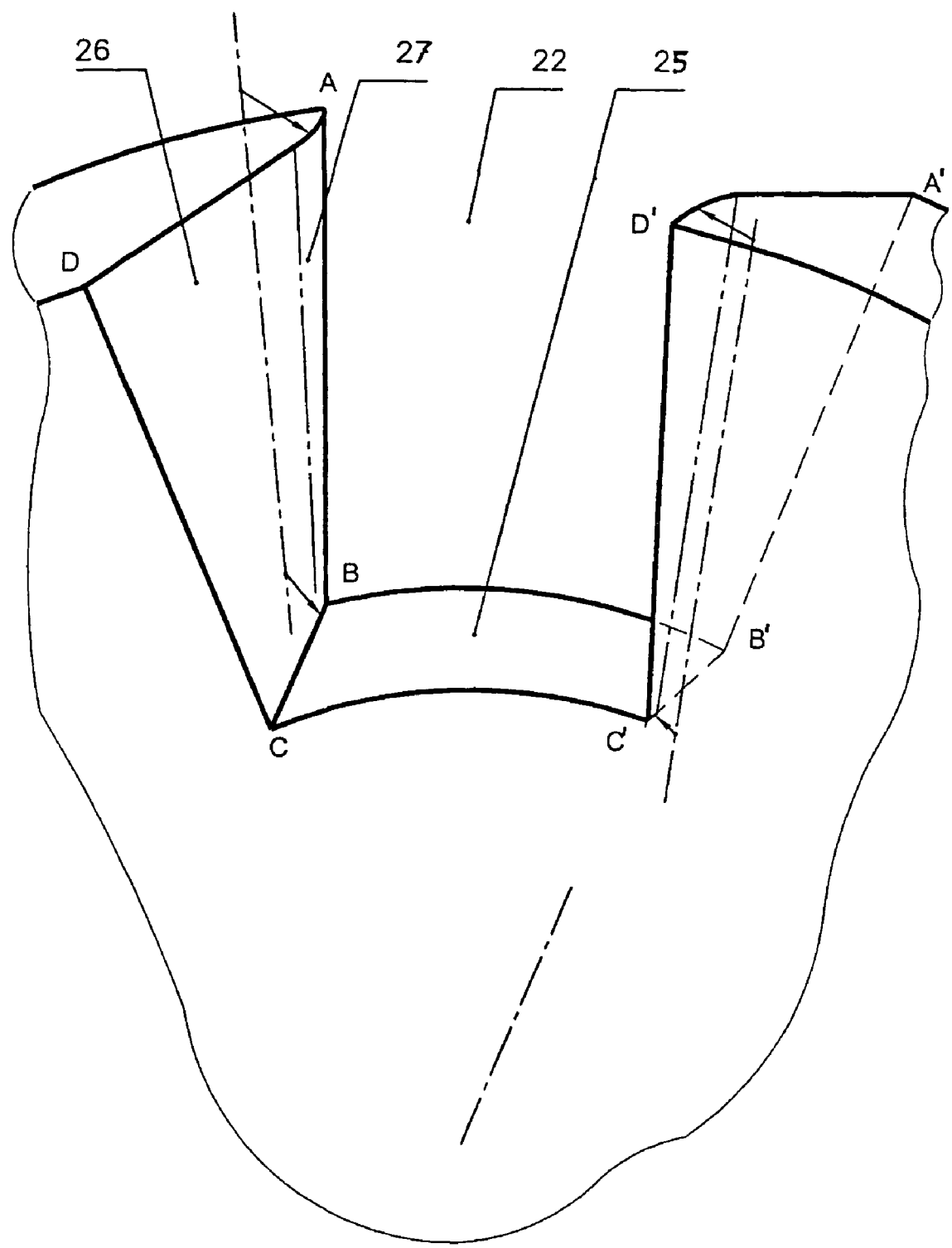

FIG. 9 also shows a recess 22 in the disk 18 of the DRM. It is the rib AB of the side face 26 (ABCD) of the recess 22 that is in fact the disk contacting portion 27, said rib interconnecting the disk end face 31 with the side face 26 of the recess 22. A second disk contacting portion is made in the form of the rib C'D' disposed on the opposite side face A'B'C'D' of the recess, the ribs being disposed on the opposite end faces 31 of the disk.

FIG. 1 represents the arrangement of the working fluid inlet ports 23 on the shaft 1 of a DRM. FIG. 4 represents the arrangement of the working fluid inlet ports 23 on the casing 8 of a DRM. Arrangement of the working fluid inlet ports 23 both on the shaft 1 and the casing 8 is not shown in the drawings. Arrangement of the working fluid outlet ports 24 on the shaft 1 of a DRM is shown in FIG. 1 and their arrangement on the casing 8, in FIG. 4. Whenever it becomes necessary, the outlet ports 24 are arranged both on the shaft 1 and the casing 8 (not shown).

Figure 10:
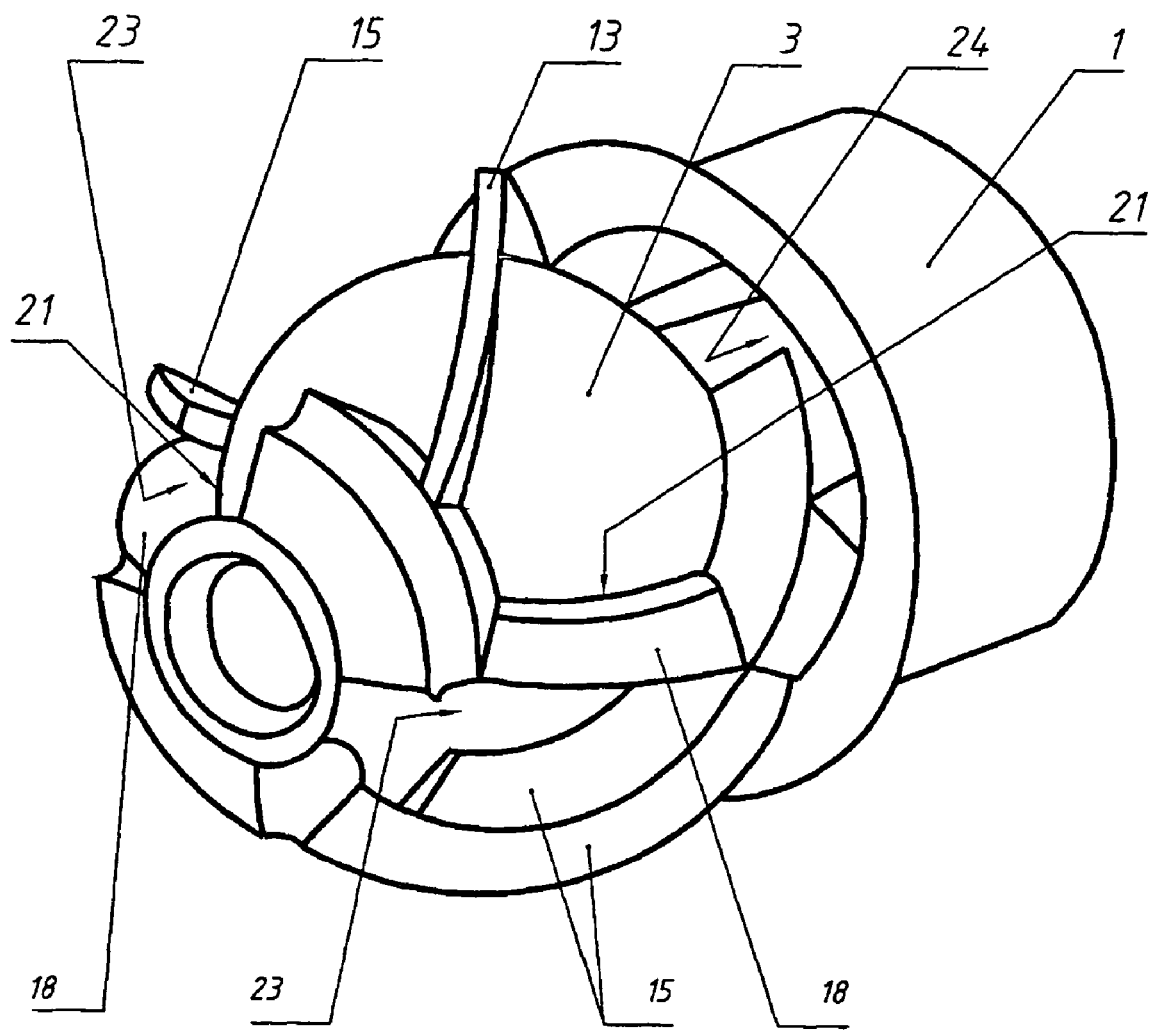
FIG. 10 is a perspective view of a DRM wherein to provide a power transmitting through the shaft (axis), the working fluid is fed through the rotating drive rotor, and two disks with a large overlap are provided.

An alternative embodiment of the inventive DRM as a pump is depicted in FIG. 10, wherein the shape of the surface 3 on the shaft 1 is approximately spherical. The disk 18 protrudes from the shaft 1 into the working chambers by about one-third (as for the angular dimension thereof) of its overall length, which improves the pump specific characteristics irrespective of whether the torque is transmitted via a shaft, a belt transmission or a gearing. In cases where the torque is transmitted via a shaft, the working fluid is fed under a low pressure through the wall 9 of casing 8. Thus a constructional arrangement is realized, wherein a high-pressure tube for withdrawing the working fluid is accommodated inside a low-pressure tube for feeding the working fluid (not shown). In this case leaks due to loose spots from high-pressure tube get into the low-pressure tube.

Figure 11:
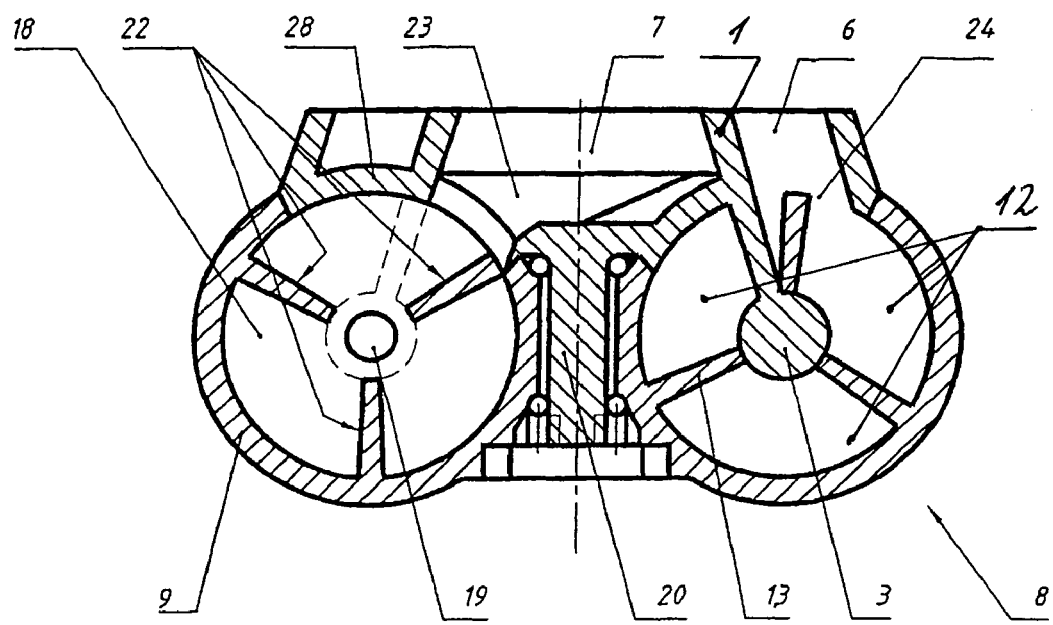
FIG. 11 is a view of a DRM in the form of a compressor.

One more embodiment of the present invention is a compressor shown in FIG. 11, wherein the disk 18 is made integral with its axle 19. The disk thickness diminishes towards its periphery. The disk has three radial recesses 22 spaced apart symmetrically at the periphery thereof. The surface 3 of the shaft 1 is torus-shaped. The ring 28 of the shaft 1 is a breadthwise fragment of a hollow torus which is complemented to a full torus by the wall 9 of casing 8. Three symmetrically arranged chamber-defining spaces 12 are interposed between casing 8 and the shaft 1. Low-pressure working fluid is fed through the inlet manifold 6 shaped as a tube inside which an outlet manifold 7 is accommodated. The outlet manifold 7 is made in the form of a tube for withdrawing high-pressure working fluid.

Figure 12:
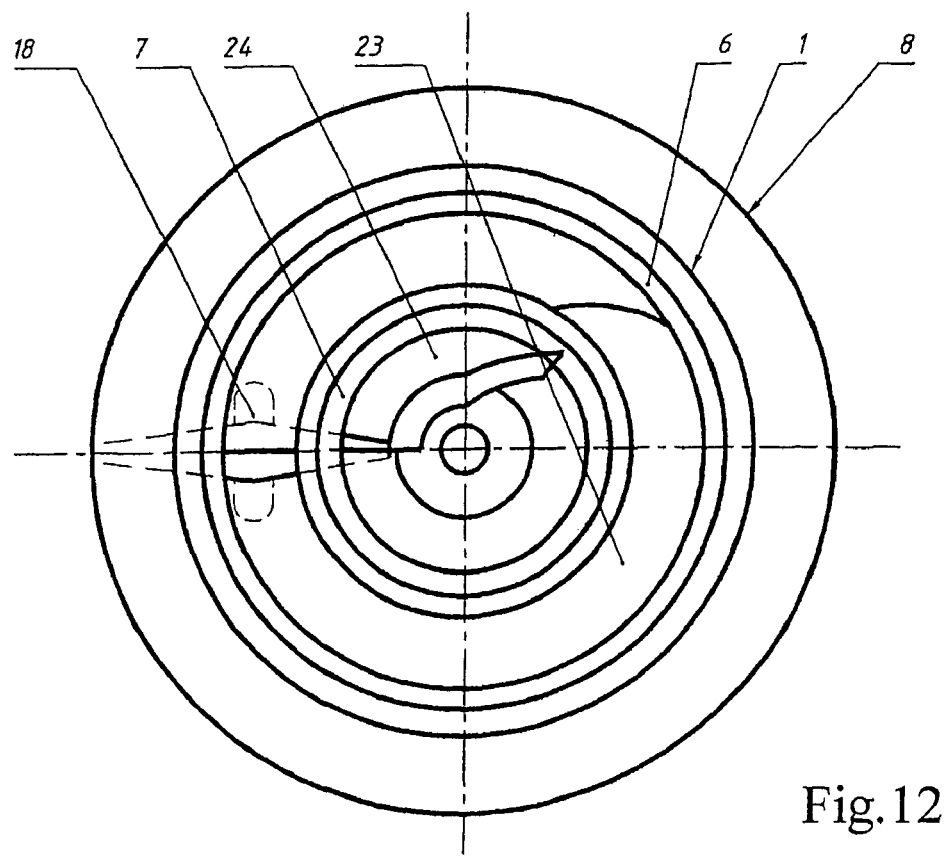
FIG. 12 is a top view of the compressor of FIG. 11.

To increase compression ratio of the compressor without affecting the dimension of the outlet port 24 use is made for an effect of reducing the dimensions of the working chambers by their having from the torus outer side to the inner side thereof. To further increase the compression ratio, the outlet ports 24 adjacent to the disk 18 have smaller angular dimensions than the inlet port 23 (which is well seen on FIG. 12) adjacent to the disk 18 on the opposite side. Drive is effected through a shaft.

Figure 13:
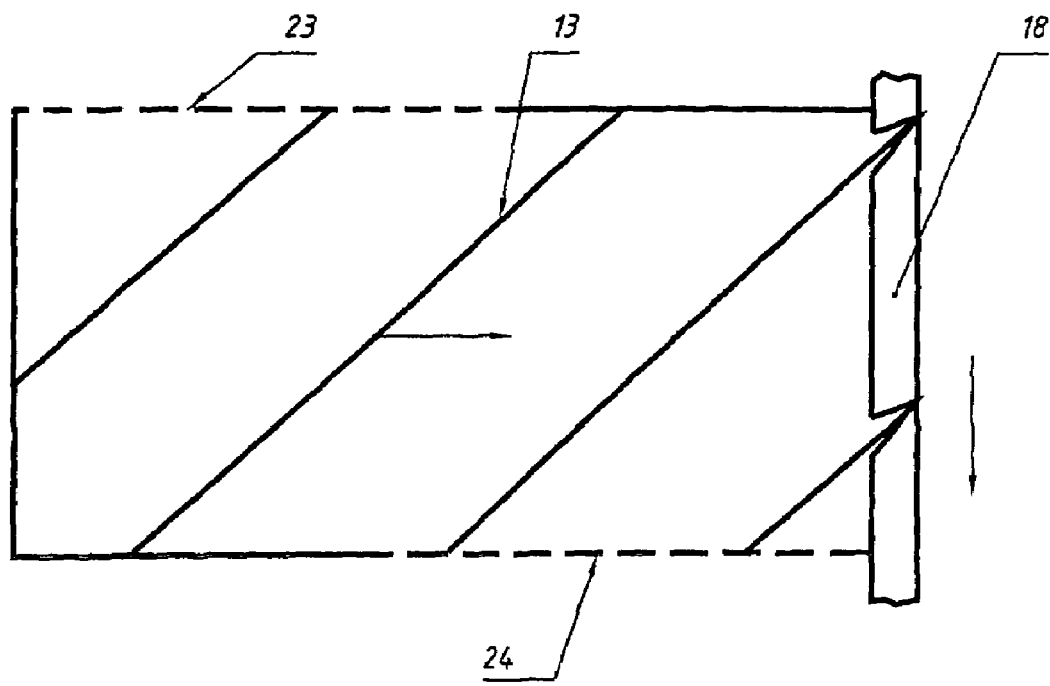
FIG. 13 is a developed view of the toroidal section illustrating operation of a DRM in the form of a compressor comprising a single disk.

FIG. 13 shows a developed view of the toroidal section illustrating operation of the DRM made in the form of a pump having a single disk. This view differs from the developed view shown in FIG. 7 in the angle of slope of the ribs 13 and in that only one disk 18 is shown therein and accordingly there are half as many inlet and outlet ports. Moreover, the inlet ports 23 and the outlet ports 24 occupy only part of the angular dimension of the shaft 1. When comparing the developed views shown in FIGS. 7 and 13, one can take notice of a difference in the degree of loading of the disks, i.e., a variable-magnitude and reversible but partly compensated for cocking moment presented in the developed view of FIG. 7 and a constant moment shown in the developed view of FIG. 13.

Figure 14:
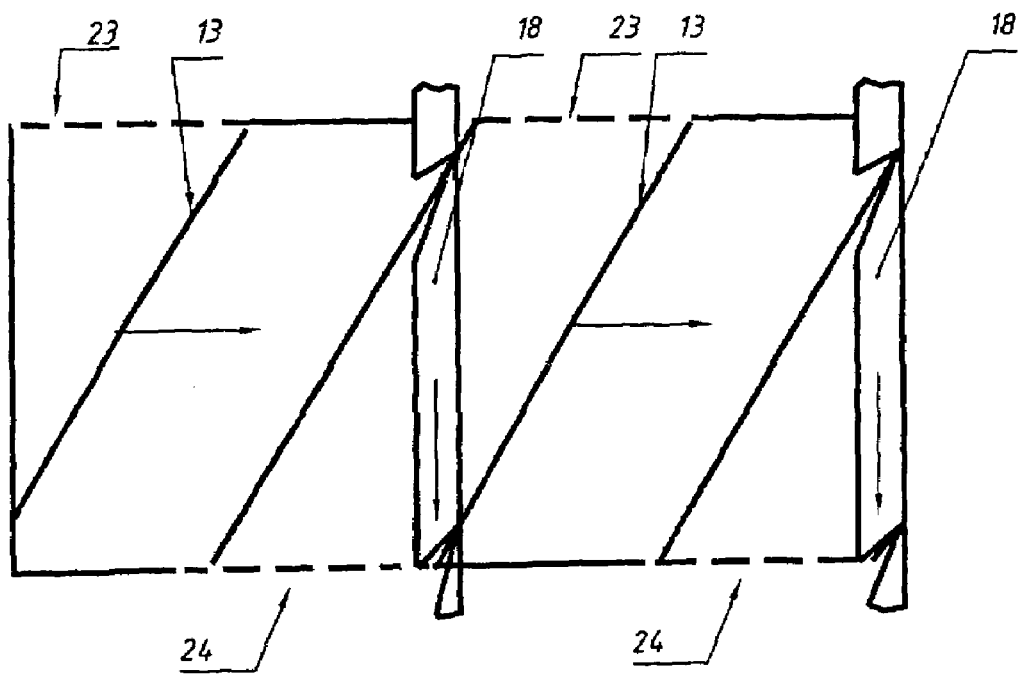
FIG. 14 is a developed view of the toroidal section illustrating operation of the DRM of FIG. 10.

The developed view of a toroidal section of FIG. 14, which illustrates operation of the DRM made in the form of a pump shown in FIG. 10, differs from the developed view of FIG. 13 by the provision of two disks 18 which leads to another angle of slope of the ribs 13.

The fluid-flow positive displacement rotary machine of the present invention operates as follows.

Now the operation of a DRM made in the form of a pump (FIG. 1) and a developed view of the toroidal section through said pump (FIG. 13) will hereinafter be considered. Sections (edges) of the development pass on the disk (vertical edge) and on the circular surface 3 (horizontal edge). Three constant-volume chamber-defining spaces 12 are formed by the shaft 1 (stator) and the casing 8 (rotor). While operating (i.e., rotating from the drive) the disk 18 subdivides the three spaces 12 (and sometimes two of said spaces 12) into chambers whose volume increases as the casing 8 rotates, and which communicate with the working fluid inlet 23 port, and into chambers having a volume decreasing as the casing 8 rotates and which communicate with the working fluid outlet port 24. It is a feature of such arrangement that during a part of the working cycle the chamber-defining space 12 is free from the disk 18 and said space 12 communicates neither with the working fluid inlet port 23 nor with the working fluid outlet port 24.

Now referring to a fluid-flow positive displacement rotary machine made in the form of a higher fluid-tightness pump (FIG. 4), a single chamber-defining space 12 is formed by the rotary shaft 1 and the stationary-fixed casing 8, said space 12 having its constant-cross-sectional area portion which is continuously covered by a recess-free portion of one of the disks 18, and the working fluid is forced to flow along said portion from the working fluid inlet port 23 to the working fluid outlet port 24. Rotation of two disks 18 is synchronized so that at least one of them engages with the casing 8. It is a feature of such arrangement that the different-pressure chambers are separated from each other by the recess-free portion of the disk 18, which makes it possible to low quality requirements imposed on the surface of the recess 22.

Operation of the DRM made in the form of a pump having a shaft 1 serving as the rotor, a casing B serving as the stator, and two disks 18 overlapping each other (FIG. 5) is illustrated by a developed view of the toroidal section thereof (FIG. 7). Three constant-volume chamber-defining spaces 12 are defined by the shaft 1 and the casing 8, said spaces communicating the working fluid inlet ports 23 with the working fluid outlet ports 24. The disks 18 subdivide said spaces 12 into the chambers whose volume increases as the shaft 1 rotates with respect to the casing 8 rotates and which are in fluid communication with the working fluid inlet port 23, and into the chambers having their volume decreasing as the shaft 1 rotates with respect to the casing 8 and which communicate with the working fluid outlet port 24.

Operation of the DRM made in the form of a shaft-driven pump (FIG. 10, wherein the shaft is not shown) is illustrated by a developed view of the toroidal section thereof (FIG. 14). Three constant-volume chamber-defining spaces 12 are defined by the shaft 1 and the casing 8. The disks 18 subdivide said spaces 12 into the chambers whose volume increases as the shaft 1 rotates with respect to the casing 8, and which are in fluid communication with the working fluid inlet port 23, and into the chambers whose volume decreases as the shaft 1 rotates with respect to the casing 8, and which are in fluid communication with the working fluid outlet port 24.

It is a feature of such arrangement that the boundary line between the high and the low pressures lies on one of the end faces 31 of the disk 18, whereby the load on said rotor becomes constant which in turn makes it possible to mount the disk 18 in the shaft using a hydrostatic bearing.

Operation of the DRM made in the form of a compressor (FIG. 11) is as follows. Three constant-volume chanter-defining spaces 12 are defined by the shaft 1 and the casing 8. The disk 18 subdivides the three spaces 12 (and sometimes two of said spaces 12) into chambers whose volume increases as the casing 8 rotates, and which communicate with the working fluid inlet port 23, and into chambers having a volume decreasing as the casing 8 rotates and which communicate with the working fluid outlet port 24 only after precompression of the working fluid. All the chambers pass all the phases per one drive rotor revolution, that is, (i) an increase of the volume from zero to maximum upon being brought into communication with the working fluid inlet port 23 (suction stroke), (ii) a decrease of the volume down to minimum without communication with the ports 23, 24 (compression stroke), and (iii) decreasing the volume down to zero upon being brought into communication with the working fluid outlet port 24 (exhaust stroke).

The present fluid-flow positive displacement rotary machine shown in FIG. 2 may be used as a diesel engine. It proceeds as follow. With the rotors rotating, the volume of the chambers defined by the shaft 1, casing 8, and disk 18 is increased and said chambers are filled with a fuel-air mixture through the working fluid inlet ports 23. Once the volume of said chambers has reached a local maximum, communication between the chambers and the working fluid inlet port 23 ceases. As said chambers approximate the axis of symmetry of the DRM, the volume of chambers starts decreasing due to a change in the configuration thereof. Any compression ratio is attainable by selecting ratio between the dimensions of the casing 8 and of the disks 18, as well as between the thickness thereof. When the chambers are arranged symmetrically with respect to the plane of axes of the disks 18, the compression ratio is maximized, whereby the fuel-air mixture ignites. Further on, as the chambers move away from the axis of the DRM symmetry the volume of the chambers increases. A second local maximum of the chambers' volume exceeds the first one due to different dimensions of the ports and may further be increased when the surface 3 is out-of-symmetry with respect to the plane of the axes of the disks 18, whereby each chamber may be brought in communication with the working fluid outlet (exhaust) ports 24 at a pressure equal to atmospheric one. When continuous-action spark plugs and fuel injectors are mounted in the stator recesses (not shown), a liquid-fuel internal combustion engine results.

INDUSTRIAL APPLICABILITY

A pilot model of a pump, according to the invention, was manufactured from aluminum. Routine testing of the model at the Leningrad metal-working plant in St. Petersburg were carried out successfully and confirmed its serviceability. The aforementioned advantages of the proposed invention and a wide range of materials, including ceramics, from which the herein-proposed pumps, compressors, and the rotor-type internal combustion engines may be manufactured (since a single kind of motion performed by the component parts of fluid-flow positive displacement rotary machines is their uniform rotation around stationary fixed axles, which reduces loads on the parts of the DRM), as well as high specific output at the same rotational speed thereof compared with other rotor-type machines, all this testifies a possibility of efficient use of the present invention both on industrial scale and in technology, including aircraft engineering and the automotive industry, especially when the engines of such type are disposed in the wheels of a motor vehicle.

What is claimed is:

1. A fluid flow displacement rotary machine comprising:
a casing including a first portion comprising an inclined rib formed in an inner surface thereof and a second portion without the inclined rib, said second portion being distinct from said first portion and being adjacent to said first portion along a circumferential direction of the casing;
a shaft provided coaxially with the casing, said shaft and said casing being rotatable with respect to each other;
a space defined by the inner surface of the casing and an outer surface of the shaft;
a fluid inlet and a fluid outlet communicating with said space;
two rotatable disks, each of the two disks including a recess that is engageable with the inclined rib, and being rotatably mounted on the shaft, wherein the shaft includes two grooves therein, each of which houses a portion of a corresponding disk and has a depth such that a bottom of the recess is always within the groove in the shaft, and wherein rotation of said two disks around respective axes thereof is synchronized with respect to each other;
wherein when the shaft and the casing rotate with respect to each other, the two disks are moved with the shaft with respect to the casing, and a first disk of the two disks moves across the second portion to push fluid while the recess of the first disk is positioned within the corresponding groove in the shaft; and
wherein while the first disk moves through the second portion of the casing, the recess of a second disk of the two disks engages with the inclined rib such that the second disk rotates about the axis thereof, and the first disk is rotated about the axis thereof synchronously with the second disk as the two disks move with the shaft.

2. The fluid flow machine of claim 1, wherein the shaft comprises a circular ridge on the outer surface thereof.

3. The fluid flow machine of claim 2, wherein an axle of each of the two disks is mounted in the circular ridge.

4. The fluid flow machine of claim 3, wherein a part of the axle extends out from the circular ridge.

5. The fluid flow machine of claim 1, wherein the casing is stationarily fixed and the shaft is rotatable about the axis thereof.

6. The fluid flow machine of claim 5, wherein the inlet port and the outlet port are provided in the casing.

7. The fluid flow machine of claim 1, wherein the shaft is stationary and the casing is rotatable.

8. The fluid flow machine of claim 7, wherein the inlet port and the outlet port are provided in the shaft.

* * * * *